United States Patent
Minemura et al.

(10) Patent No.: US 8,629,586 B2
(45) Date of Patent: Jan. 14, 2014

(54) ELECTRIC ROTATING MACHINE WITH COOLING MECHANISM

(75) Inventors: Akitoshi Minemura, Nishio (JP); Hirohito Matsui, Okazaki (JP); Naoki Hakamada, Anjo (JP); Kazuya Onuki, Chita-gun (JP); Shinji Kouda, Kariya (JP); Takashi Matsumoto, Toyota (JP)

(73) Assignees: Nippon Soken, Inc., Nishio (JP); Denso Corporation, Kariya (JP); Toyota Jidosha Kabushiki Kaisha, Toyota (JP)

( * ) Notice: Subject to any disclaimer, the term of this patent is extended or adjusted under 35 U.S.C. 154(b) by 322 days.

(21) Appl. No.: 12/975,989

(22) Filed: Dec. 22, 2010

(65) Prior Publication Data

US 2011/0156509 A1 Jun. 30, 2011

(30) Foreign Application Priority Data

Dec. 24, 2009 (JP) ................. 2009-293043

(51) Int. Cl.
*H02K 9/00* (2006.01)
*H02K 9/19* (2006.01)
*H02K 5/20* (2006.01)

(52) U.S. Cl.
CPC .. *H02K 9/19* (2013.01); *H02K 9/00* (2013.01); *H02K 5/20* (2013.01)
USPC .................. 310/54; 310/52; 310/58; 310/59; 310/112

(58) Field of Classification Search
CPC ............. H02K 9/19; H02K 5/20; H02K 3/22; H02K 9/00
USPC .................................. 310/52, 54, 59, 58, 112
See application file for complete search history.

(56) References Cited

U.S. PATENT DOCUMENTS

| 5,372,213 A * | 12/1994 | Hasebe et al. ............... 180/65.6 |
| 5,718,302 A * | 2/1998 | Hasebe et al. ............... 180/65.6 |
| 6,201,365 B1 * | 3/2001 | Hara et al. .................... 318/558 |

(Continued)

FOREIGN PATENT DOCUMENTS

| JP | 50-027161 | 9/1975 |
| JP | 62-132660 | 8/1987 |

(Continued)

OTHER PUBLICATIONS

Japanese Official Communication issued for Japanese Patent Application No. 2009-293043, dated Jul. 23, 2013 with partial English translation.

*Primary Examiner* — John K Kim
(74) *Attorney, Agent, or Firm* — Nixon & Vanderhye P.C.

(57) ABSTRACT

An electric rotating machine includes a rotor, a stator in which a coil is so wound as to have an coil end, and a coolant supply pipe. The coolant supply pipe lies with a length thereof extending substantially parallel to an axis of rotation of the rotor and is disposed above the stator in a direction of gravitational force. The coolant supply pipe has a first and a second coolant outlet through which coolant is to be emitted to the coil end. The first and the second coolant outlets are so oriented as to direct streams of the coolant to a first area and a second area of the coil end which are different in location from each other. This enables the coolant to be emitted to almost the whole of the coil end even when the electric rotating machine is titled in a direction in which the rotor turns.

6 Claims, 6 Drawing Sheets

(56) References Cited

U.S. PATENT DOCUMENTS

| | | | |
|---|---|---|---|
| 7,402,923 B2* | 7/2008 | Klemen et al. | 310/54 |
| 8,169,110 B2* | 5/2012 | Swales et al. | 310/54 |
| 8,269,383 B2* | 9/2012 | Bradfield | 310/58 |
| 2003/0038549 A1* | 2/2003 | Pyrhonen | 310/58 |
| 2003/0102728 A1* | 6/2003 | Chen et al. | 310/52 |
| 2007/0063592 A1* | 3/2007 | Pashnik et al. | 310/54 |
| 2007/0278869 A1* | 12/2007 | Taketsuna | 310/54 |
| 2009/0206688 A1* | 8/2009 | Sano et al. | 310/58 |
| 2010/0215526 A1* | 8/2010 | Saari et al. | 417/423.8 |
| 2011/0156509 A1* | 6/2011 | Minemura et al. | 310/54 |

FOREIGN PATENT DOCUMENTS

| | | |
|---|---|---|
| JP | 3385373 | 1/2003 |
| JP | 2005-253263 | 9/2005 |
| JP | 4167886 | 8/2008 |

\* cited by examiner

ELECTRIC ROTATING MACHINE WITH COOLING MECHANISM

CROSS REFERENCE TO RELATED DOCUMENT

The present application claims the benefit of priority of Japanese Patent Application No 2009-293043 filed on Dec. 24, 2009, the disclosure of which is incorporated herein by reference.

BACKGROUND

1. Technical Field of the Invention

The present invention relates generally to an electric rotating machine with a cooling mechanism which is designed to ensure cooling ability in supplying coolant to coil ends of a stator of the electric rotating machine even when the electric rotating machine is tilted in a given direction.

2. Background Art

Japanese Patent No. 4167886 teaches a cooling mechanism for cooling coil ends of a stator installed in an electric rotating machine. The cooling mechanism includes arc-shaped coolant channels to which a liquid coolant is fed. Each of the coolant channels has openings formed in a bottom thereof as coolant outlets from which the coolant is drained onto a corresponding one of the coil ends. The coolant channel also has hollow cylindrical guides joined to the outlets, respectively, to guide streams of the coolant into selected portions of the coil end in order to ensure the capability of the cooling mechanism in cooling the coil end.

The electric rotating machine is usually tilted for some reason in either of opposite horizontal directions in which an rotating axis of the electric rotating machine is inclined. In order to ensure the cooling capability in such an event, the coolant outlets are arranged in two lines, with the outlets being staggered between the two lines in a lengthwise direction of the coolant channel. When the electric rotating machine is tilted in either of the horizontal directions, the coolant is drained at least from either of the two-line coolant outlets, thereby assuring the draining of the coolant onto the coil end.

The electric rotating machine may, however, be tilted in another direction in which the axis is merely turned without being inclined. The cooling mechanism is so designed that the coolant is supplied to the central top of the arc-shaped coolant channel. When the electric rotating machine is tilted in the above axis-turning direction, it may, therefore, result in a failure in draining the coolant from either of opposed ends of the coolant channel onto a portion of the coil end.

The coolant outlets of the coolant channel are located just above an outer circumferential surface of the coil end. The coolant drops from the cylindrical guides and flows downward along the outer circumferential surface of the coil end and, thus, hardly reaches an outer or an inner surfaces of the coil end which are opposed in the axial direction of the coil end, which may result in a lack in cooling the coil end as a whole.

The above cooling mechanism, therefore, has the problem in that the cooling capability may be deteriorated depending upon a direction in which the electric rotating machine is tilted.

SUMMARY

It is therefore a principal object of the invention to avoid the disadvantages of the prior art.

It is another object of the invention to provide an improved structure of an electric rotating machine with a cooling mechanism designed to ensure the cooling ability in supplying coolant to a coil end of a stator of the electric rotating machine even when the electric rotating machine is tilted in a given direction.

According to one aspect of the invention, there is provided an electric rotating machine which may be employed as an electric motor or an electric generator. The electric rotating machine comprises: (a) a rotor; (b) a rotating shaft which is to be rotated by the rotor; (c) a stator which faces a circumference of the rotor, the stator having formed therein a plurality of slots through which a coil is so wound as to have a coil end extending outside an end of the stator in an axial direction of the stator; (d) a coolant supplying mechanism which supplies coolant; (e) a coolant supply cylindrical member through which the coolant, as supplied from the coolant supplying mechanism, flows, the coolant supply cylindrical member having a length extending substantially parallel to an axis of rotation of the rotor and being disposed above the stator in a direction of gravitational force; and (f) a first and a second coolant outlet which are formed in the coolant supply cylindrical member and through which the coolant is to be emitted to the coil end. The first and the second coolant outlets are so oriented as to direct streams of the coolant to a first area and a second area of the coil end which are different in location from each other.

The coolant supply cylindrical member may be of a circular or a polygonal shape in transverse cross section. The coolant supply cylindrical member extends substantially parallel to the axis of rotation of the rotor and is disposed adjacent and above the stator in a vertical direction of the electric rotating machine. The first and second coolant outlets create the streams of the coolant which are oriented in directions different from each other, thereby cooling the first and second area of the coil end different in location from each other. This ensures the stability in cooling almost the whole of the coil end even when the electric rotating machine is tilted in a direction in which the rotor turns.

In the preferred mode of the invention, the first and second coolant outlets are located away from each other across a plane extending through a longitudinal center line of the coolant supply cylindrical member and an axial center line of the rotor. In other words, the first and second coolant outlets are located away from each other in a direction perpendicular to the axis of rotation of the rotor. This causes the streams of the coolant to be directed in opposite circumferential directions of the coil end, thereby distributing the coolant almost evenly to the first and second areas of the coil end even when the electric rotating machine is tilted in the direction in which the rotor turns.

The first and second coolant outlets may be located so that a center line passing through a center of an opening of each of the first and second coolant outlets is offset toward a side surface of the coil end from a center line passing through a center of a width of the coil end in an axial line of the coil. In other words, the first and second coolant outlets are located near the side surface of the coil end, thereby discharging a large volume of the coolant to the side surface of the coil end, which enhances the efficiency in cooling the side surface which is usually difficult to cool.

The first coolant outlet is greater in open area from the second coolant outlet. This enables a large volume of the coolant to be emitted to a desired area of the coil end to increase the efficiency in cooling the desired area when the electric rotating machine is titled. The first coolant outlet will preferably be nearer to the top of the coil end than the second coolant outlet when the electric rotating machine is tilted.

The coolant supply cylindrical member may include guides, one for each of the first and second coolant outlets. Each of the guide defines a direction in which the coolant is to be emitted from a corresponding one of the first and second coolant outlets. This enhances the accuracy in directing the streams of the coolant to desired areas of the coil end.

The first coolant outlet which becomes closer to a plane extending through the axis of rotation of the rotor in the direction of gravitational force than the second coolant outlet when the electric rotating machine is tilted in a direction in which the rotor turns may be greater in open area than the second coolant outlet.

The coolant supply cylindrical member may lie with the length thereof being offset in a direction perpendicular to the direction of gravitational force from a plane extending through the axis of rotation of the rotor in the direction of gravitational force.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
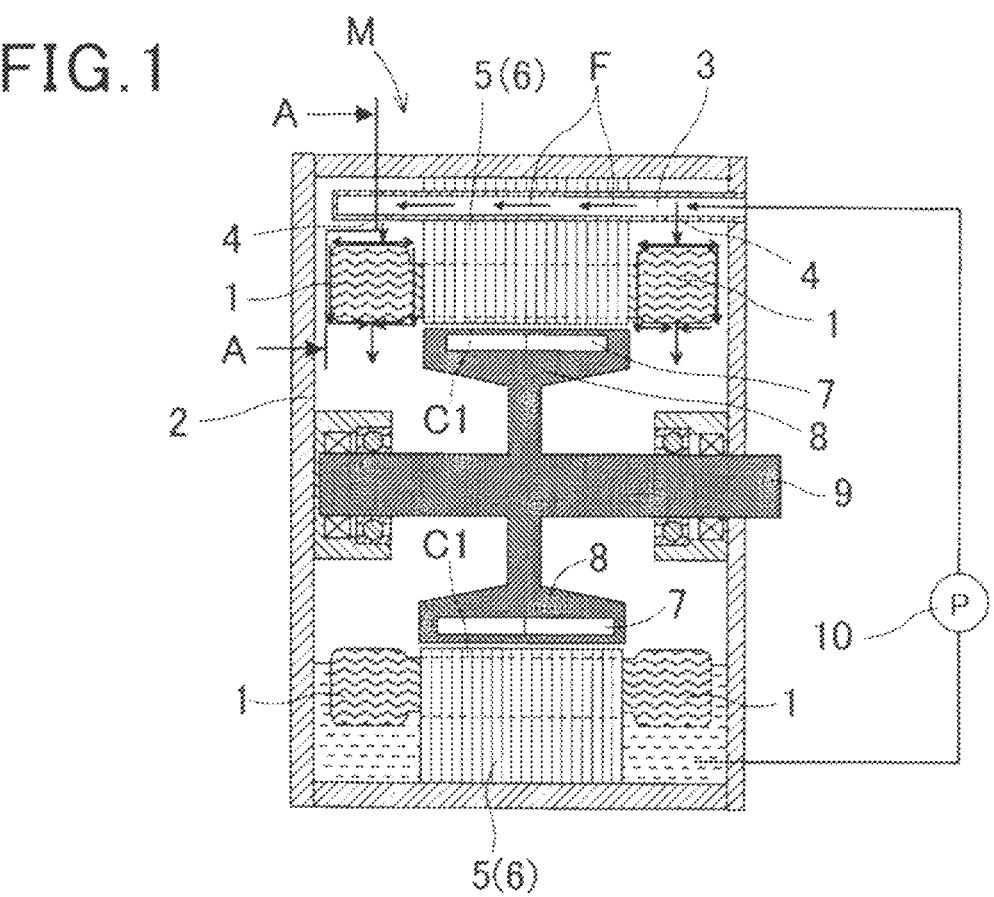
FIG. 1 is a longitudinal sectional view which shows an electric rotating machine with a cooling mechanism according to the first embodiment of the invention.
Figure 2A:
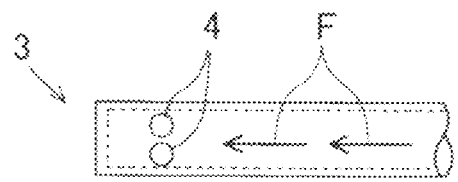
FIG. 2(a) is a partial bottom view of a coolant supply pipe installed in the electric rotating machine of FIG. 1.
Figure 2B:
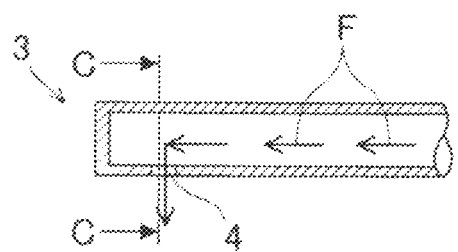
FIG. 2(b) is a longitudinal sectional view of the coolant supply pipe in FIG. 2(a)
Figure 2C:
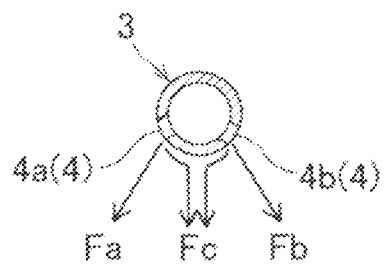
FIG. 2(c) is a transverse sectional view, as taken along the line C-C in FIG. 2(b)
Figure 3A:
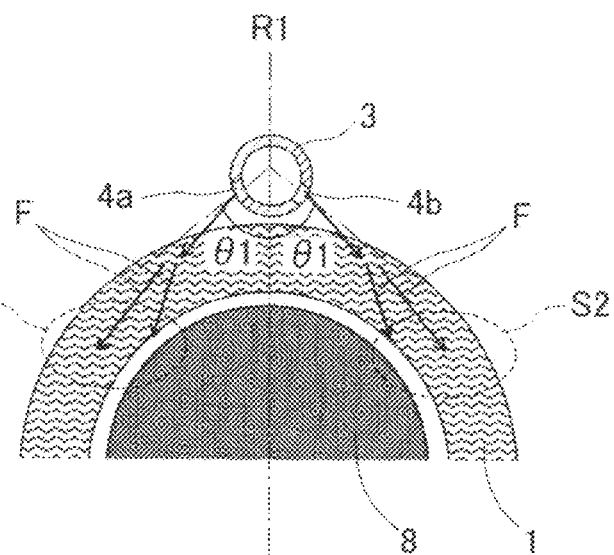
FIGS. 3(a) and 3(b) are schematically transverse sectional views, as taken along the line A-A in FIG. 1, which illustrate a positional relation between a coolant supply pipe and a coil end and streams of coolant.
Figure 3B:
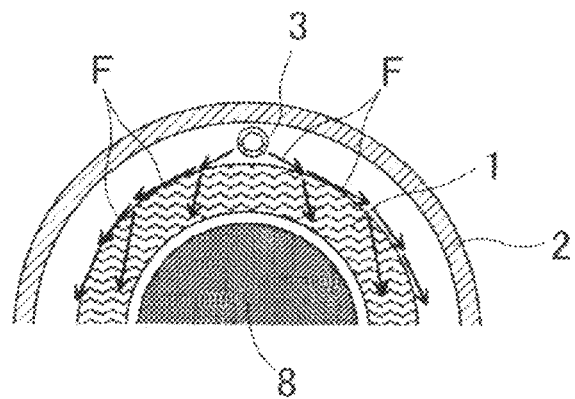
Figure 4:
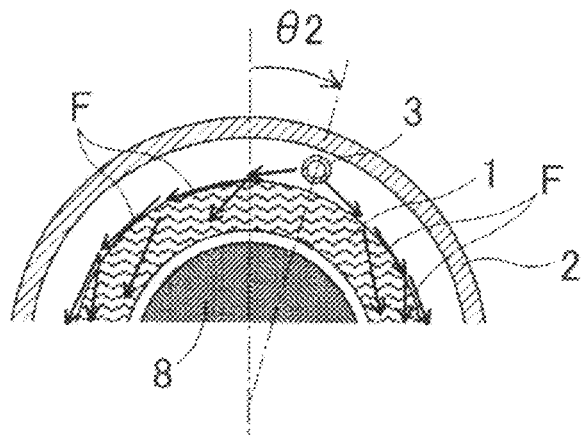
FIG. 4 is a schematically partially transverse sectional view, as taken along the line A-A in FIG. 1, which illustrate a positional relation between a coolant supply pipe and a coil end and streams of coolant when the electric rotating machine M is tilted.

Referring to the drawings, wherein like reference numbers refer to like parts in several views, particularly to FIG. 1, there is shown an electric rotating machine M equipped with a cooling mechanism according to the first embodiment of the invention. FIG. 1 is a longitudinal sectional view of the electric rotating machine M, FIG. 2(a) is a partial bottom view which illustrate a coolant supply pipe 3 disposed in the electric rotating machine M of FIG. 1. FIG. 2(b) is a longitudinal sectional view which shows the coolant supply pipe 3. FIG. 2(c) is a transverse sectional view, as taken along the C-C in FIG. 2(b). FIGS. 3(a) and 3(b) are schematically transverse sectional views, as taken along the line A-A in FIG. 1, which illustrate a positional relation between the coolant supply pipe 3 and a coil end 1 and streams of coolant when the electric rotating machine M is placed at a correct orientation, as illustrated in FIG. 1, without being inclined in any direction. FIG. 4 is a transverse sectional view, as taken along the line A-A in FIG. 1, which illustrate a positional relation between the coolant supply pipe 3 and a coil end 1 and streams of coolant when the electric rotating machine M is tilted. The electric rotating machine M is usually placed in an orientation, as illustrated in FIG. 1, so that the coolant flows downward, as viewed in the drawing, by gravity.

The electric rotating machine M of FIG. 1 is used as an electric generator or an electric motor. The electric rotating machine M is, as illustrated in FIG. 1, equipped with a casing 2 (also called a frame or housing), a stator 6, a rotor 8, a rotating shaft 9 (i.e., a power input/output shaft), a coil C1, and the coolant supply pipe 3. The stator 6, the rotor 8, the rotating shaft 9, the coil C1, the coolant supply pipe 3 are disposed inside the casing 2. The electric rotating machine M is also equipped with a pump 10 and a cooling device (not shown) such as an oil cooler which are disposed outside the casing 2.

The rotor 8 is retained by bearings within the casing 2 to be rotatable along with the rotating shaft 9. The rotor 8 is formed integrally with the rotating shaft 9, but may alternatively be made of a separate member welded, glued, or joined mechanically to the rotating shaft 9 through threads, bolts, or another similar mechanism.

The stator 6 which is made of an electromagnet (or a permanent magnet) is disposed around the outer circumference of the rotor 8. The stator 6 has comb-like teeth 5 which define slots (not shown), each between adjacent two of the teeth 5. Conductive wire is wound through the slots to form the coil C1 (i.e., a stator coil). Specifically, the coil C1 is made up of a plurality of turns of the wire with opposed folded portions of each turn disposed outside opposed ends of a core of the stator 6 to form so-called coil ends 1. The coil C1 is of a hollow cylindrical shape. The coil ends 1 of the coil C1 extend from the opposed ends of the core of the stator 6 in opposite directions in parallel to the axis of the electric rotating machine M (i.e., the length of the rotating shaft 9).

The coolant supply pipe 3 is disposed in a top portion (i.e., an upper portion, as viewed in FIG. 1) of the casing 2 to direct the liquid coolant such as oil, as supplied from the pump 10, to the coil ends 1. The coolant supply pipe 3 is of a hollow cylindrical shape and defines therein a coolant flow path. The coolant supply pipe 3 extends above or on the top of the stator 6 substantially parallel to the axis of rotation of the rotor 8 and lies over tops of the coil ends 1 so that the coolant will drop onto the coil ends 11 and flow downward widely along outer surfaces thereof. For instance, the coolant supply pipe 14 is preferably located within an angular range defined by lines extending outward from the center of the coil end 1 (i.e., the stator 6) at angles of −45° to +45°, preferably −20° to +20° to a vertical center line extending through the center of the coil end 1 in the direction of gravitational force.

The coolant supply pipe 3 is, as described above, of a hollow cylindrical shape and has formed therein a plurality of coolant outlets 4 from which the coolant is to be drained onto the coil ends 1. In this embodiment, the coolant supply pipe 3 has the four coolant outlets 4, two for each of the coil ends 1. The coolant outlets 4 are located just above the coil ends 1. Arrows F in FIG. 1 represent paths of flows of the coolant. The same applies to other drawings. The coolant, as fed from the pump 10, moves inside the coolant supply pipe 3, drops from the coolant outlets 4 onto the coil ends 1, and then flows downward along the surface of the coil ends 1. A combination of the coolant supply pipe 4 and the pump 10 servers as a coolant supply mechanism.

The structure of the coolant supply pipe 3 will be described below in detail with reference to FIGS. 2(*a*) to 2(*c*). FIG. 2(*a*) is a bottom view of the coolant supply pipe 3. FIG. 2(*b*) is a longitudinal sectional view, as taken along the longitudinal center line of the coolant supply pipe 3. FIG. 2(*c*) is a transverse sectional view, as taken along the line C-C in FIG. 2(*b*).

The coolant supply pipe 3, as described above, has the two coolant outlets 4 for each of the coil ends 1. The coolant outlets 4, as illustrated in FIG. 2(*a*), are for a left one of the coil ends 1, as viewed in FIG. 1, and aligned in a direction traversing the length of the coolant supply pipe 3 (i.e., the axis of rotation of the rotor 8). The same is true of the outlets 4 for a right one of the coil ends 1. The following discussion will refer to only the coolant outlets 4 for the left coil end 1 for the sake of simplicity of explanation.

The coolant outlets 4 are, as can be seen in FIGS. 2(*b*) and 2(*c*), formed in the bottom (i.e., a lower portion) of the coolant supply pipe 3. The coolant outlets 4 will also be referred to below as a first outlet 4*a* and a second outlet 4*b*, as illustrated in FIG. 3(*c*). The coolant is emitted from the right outlet 4*a* in a left obliquely downward direction, as indicated by an arrow Fa, and also from the left outlet 4*b* in a right obliquely downward direction, as indicated by an arrow Fb. The coolant usually drops from each of the first and second outlets 4*a* and 4*b* along a parabolic curve. As the pressure of the coolant in the coolant supply pipe 3 rises, a locus along which the coolant drops approximates to a straight line. Additionally, when the viscosity of the coolant is high, the coolant partially moves along the outer peripheral surface of the coolant supply pipe 3 and then drops naturally on the coil end 1 in a vertical direction Fc.

The electric rotating machine M is, as described above, usually placed in the orientation, as illustrated in FIG. 1, with the rotating shaft 9 extending substantially perpendicular to a direction of gravitational force, but may be tilted for some reason in a direction in which the rotating shaft 9 is turned (i.e., a circumferential direction of the rotor 8). Streams of the coolant when the electric rotating machine M is placed in the correct orientation of FIG. 1 and tilted will be explained with reference to FIGS. 3(*a*) to 4. FIGS. 3(*a*) and 3(*b*) illustrates for the case where the electric rotating machine M is in the correct orientation. FIG. 4 illustrates for the case where the electric rotating machine M is tilted in the circumferential direction of the rotor 8. FIG. 3(*a*) represents a positional relation among the coil end 1, the coolant supply pipe 3, and the first and second outlets 4*a* and 4*b*. FIGS. 3(*b*) and 4 demonstrate streams of the coolant drained from the first and second outlets 4*a* and 4*b*.

When the electric rotating machine M is in the correct orientation, as illustrated in FIGS. 3(*a*) and 3(*b*), the coolant supply pipe 3 lies horizontally. Each of the first outlet 4*a* and the second outlet 4*b* faces the coil end 1 at an angle $\theta 1$ to a vertical center line R1 which passes through radial centers of the coolant supply pipe 3 and the stator 6 (i.e., the rotor 8). Specifically, the coolant supply pipe 3 extends horizontally with a length (i.e., a longitudinal center line) thereof lying parallel to the axis of rotation of the rotor 8 (i.e., the stator 6). An angle which an axial center line of each of the first and second outlets 4*a* and 4*b* makes with the vertical center line R1 (i.e., the direction of gravitational force) is the angle $\theta 1$. The first and second outlets 4*a* and 4*b* face a left and a right portion of the coil end 1, as viewed in FIG. 3(*a*), respectively. In other words, the first and second outlets 4*a* and 4*b* are located to be mirror-symmetrical with respect to a plane extending through the longitudinal center line of the coolant supply pipe 3 and the axial center line of the rotor 8, that is, in parallel to the vertical center line R1.

The coolant, as emitted from the first outlet 4*a*, flows downward along the left portion S1 of the coil end 1, while the coolant, as emitted from the second outlet 4*b*, flows downward along the right portion S2 of the coil end 1. When the first and second outlets 4*a* and 4*b* are identical in open area thereof, the coolant will be distributed evenly to the right and left portions S2 and S1 of the coil end 1, thereby cooling almost the whole (i.e., the entire circumference) of the coil end 1.

When the electric rotating machine M is, as illustrated in FIG. 4(*b*), tilted at the angle $\theta 2$ from the correct orientation of FIG. 3(*a*) in a clockwise direction, as viewed in the drawing, the coolant is drained from the first and second outlets 4*a* and 4*b* and then flows along the right and left portions of the coil end 1. When the first and second outlets 4*a* and 4*b* axe identical in open area thereof, the coolant will be distributed evenly to the right and left portions of the coil end 1. The distance the coolant, as drained from the left outlet 4*a*, moves on the coil end 1 is longer than that the coolant, as drained from the right outlet 4*b*, so that the temperature of the coolant rises greatly as approaching a lower left portion of the coil end 1. This causes the degree to which the left portion of the coil end 1 is cooled to be smaller than that to which the right portion of the coil end 1 is cooled. However, flowing of the coolant over almost the entire periphery of the coil end 1 is achieved by supplying a large amount of the coolant to the coolant supply pipe 3.

When the electric rotating machine M is tilted at the angle θ2 in a counterclockwise direction that is opposite to that in FIG. 4, the coolant is drained from the coolant supply pipe 3 and then flows on the coil end 1 in the same manner as in FIG. 4. The cooling mechanism of this embodiment ensures the stability in cooling the coil ends when the electric rotating machine M is tilted in either of the opposite directions in which the rotor 8 turns.

The structure of the cooling mechanism of the electric rotating machine M of this embodiment offers the following advantages.

The coolant supply pipe 3, as described above, extends substantially parallel to the axis of rotation of the rotor 8 and is disposed adjacent and above the stator 6 in the vertical direction of the electric rotating machine M. The first and second outlets 4a and 4b create streams of the coolant which are oriented in directions different from each other, thereby cooling desired areas of the coil end 1 different in location from each other. This ensures the stability in cooling almost the whole of the coil end 1 even when the electric rotating machine M is tilted in a direction in which the rotor 8 turns.

The first and second outlets 4a and 4b are located away from each other across a plane extending through the longitudinal center line of the coolant supply pipe 3 and the axial center line of the rotor 8. In other words, the first and second outlets 4a and 4b are located away from each other in a direction perpendicular to the axis of rotation of the rotor 8. This causes the streams of the coolant to be directed in opposite circumferential directions of the coil end 1, thereby distributing the coolant almost evenly to the desired areas of the coil end 1 even when the electric rotating machine M is tilted in the direction in which the rotor 8 turns.

Figure 5:
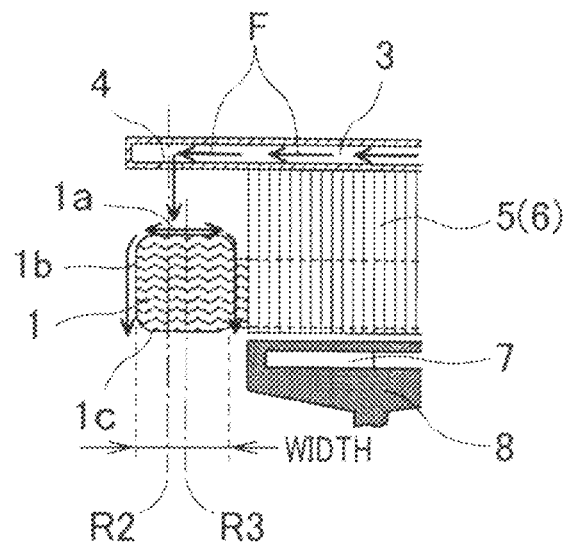
FIG. 5 is a partially enlarged sectional view of the electric rotating machine of FIG. 1 which demonstrates how streams of coolant flow.

FIG. 5 illustrates the coolant supply pipe 3 according to the second embodiment of the invention which is to be installed in the electric rotating machine M of FIG. 1. The same reference numbers as employed in the first embodiment will refer to the same parts, and explanation thereof in detail will be omitted here. FIG. 5 is a partially enlarged view of an upper left portion of the electric rotating machine M of FIG. 1.

The coolant supply pipe 3 of the first embodiment, as described above, has the two coolant outlets 4 (i.e., the first and second outlets 4a and 4b) for each of the coil ends 11. The first and second outlets 4a and 4b are, as can be seen in FIG. 1, located just above the center of the top surface of the coil end 1 in the direction of gravitational force. In other words, a vertical center line passing through the center of an opening of each of the first and second outlets 4a and 4b coincides with a vertical center line passing through the center of a width of the coil end 1, as viewed from a horizontal direction perpendicular to the axial center line of the rotor 8 in FIG. 1. In contrast, the first and second outlets 4a and 4b of the second embodiment are, as can be seen in FIG. 5, offset from the center of the top surface of the coil end 1 toward the outer side surface 1b of the coil end 1. In other words, the vertical center line R2 passing through the center of the opening of each of the first and second outlets 4a and 4b (or a line which intersects with a line passing through the centers of openings of the first and second outlets 4a and 4b and extends between the first and second outlets 4a and 4b in the direction of gravitational force) is out of alignment with the vertical line R3 passing through the center of the width of the coil end 1. This causes more coolant to flow along the outer side surface 1b of the coil end 1 An interval between the lines R2 and R3, that is, the distance by which the line R2 is separate from the line R3 may be determined experimentally in terms of requirements to cool the coil end 1. Other arrangements of the coolant supply pipe 3 will be identical with those in the first embodiment, and explanation thereof in detail will be omitted here.

Usually, it is difficult to cool the outer side surface 1b of the coil end 1. The structure of the coolant supply pipe 3 of this embodiment, however, serves to supply the coolant to the outer side surface 1b at an increased flow rate, thus enhancing the efficiency in cooling the coil end 1.

Figure 6A:
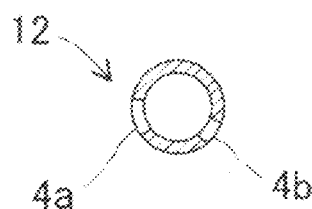
FIG. 6 (a) is a transverse sectional view of a coolant supply pipe according to the third embodiment of the invention.
FIG. 6(b) is a transverse sectional view which illustrates streams of coolant drained from the coolant supply pipe of FIG. 6(a)
Figure 6B:
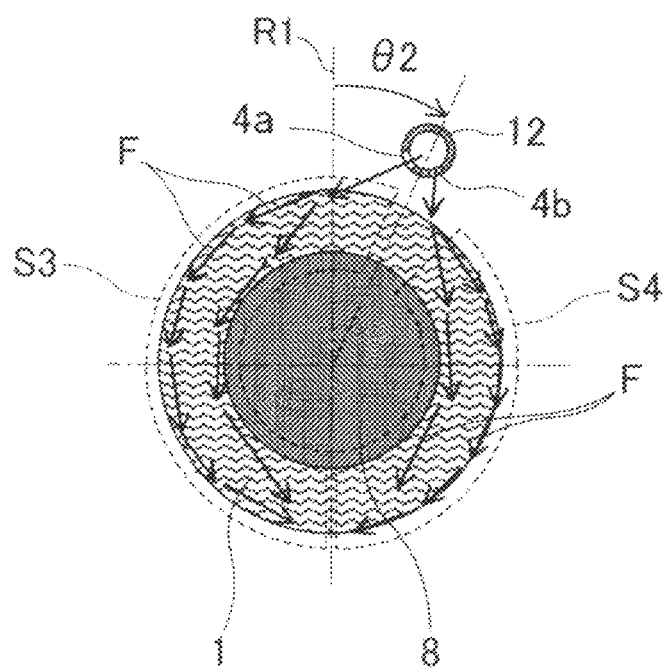

FIGS. 6(a) and 6(b) illustrate a coolant supply pipe 12 according to the third embodiment of the invention which is to be installed in the electric rotating machine M of FIG. 1 instead of the coolant supply pipe 3. The same reference numbers as employed in the first embodiment will refer to the same parts, and explanation thereof in detail will be omitted here. FIG. 6(a) is a transverse sectional view of the coolant supply pipe 12. FIG. 6(b) is a schematically transverse sectional view which shows The coolant supply pipe 12 is different from the coolant supply pipe 3 of the first embodiment in size of the first and second outlets 4a and 4b. The first and second outlets 4a and 4b of the coolant supply pipe 3 are, as can be seen from FIGS. 2(c) and 3(a), identical in area of openings thereof, while they are different from each other in this embodiment in terms of a possible inclination of the electric rotating machine M.

Specifically, the area of the opening of the first outlet 4a is greater than that of the second outlet 4b. This may be achieved by altering the diameter or shape of the opening of either of the first and second outlets 4a and 4b. For instance, the opening of either of the first and second outlets 4a and 4b may be formed into a polygonal shape.

When the electric rotating machine M is tilted in a clockwise direction, as viewed in FIG. 6(b), the first outlet 4a which has the open area greater than that of the second outlet 4b will be closer to the vertical center line R1 than the second outlet 4b, so that substantially the same amount of the coolant as when the electric rotating machine M is placed in the correct orientation of FIG. 1 is supplied to an area of the coil end 1 which is required to be cooled when the electric rotating machine M is tilted. In other words, the sizes of the first and second outlets 4a and 4b are so determined that the amount of the coolant which is to flow over a unit area of the surface of the coil end 1 is kept unchanged between when the electric rotating machine M is in the correct orientation of FIG. 1 and when it is tilted in the clockwise direction, as viewed in FIG. 6(b).

In the case where the electric rotating machine M is mounted in an automotive vehicle with the rotating shaft 9 extending in a lateral direction of a body of the vehicle, it will be tilted in a direction in which the rotor 8 turns when the vehicle starts to climb a hill. Usually, when the vehicle is climbing a hill, the electric rotating machine M operates hard, so that the quantity of heat generated by the electric rotating machine M will increase. Additionally, since the speed of the vehicle is usually low when the vehicle is climbing a hill, the coolant is sometimes fed by a gear pump instead of the pump 10, so that the flow rate of the coolant to be fed to the coolant supply pipe 12 decreases, thus resulting in increased difficulty in cooling the coil ends as compared with the vehicle is running on a horizontal road.

In order to alleviate the above drawback, the coolant supply pipe 12 of the third embodiment is so designed as to have the first outlet 4a greater in open area from the second outlet 4b which will be located farther from the vertical center line R1 than the first outlet 4a when the electric rotating machine M is tilted. Specifically, when the electric rotating machine M is tilted in the clockwise direction, as viewed in FIG. 6(b), the amount of the coolant to be discharged per unit time (i.e., the flow rate) from the first outlet 4a will be greater than that from the second outlet 4b. This will cause more amount of the coolant to flow downward over the left portion S3 of the coil end 1, which improves the degree to which the left portion S3 is cooled. The area of the surface of the right portion S4 of the coil end 1 to be cooled, as can be seen in FIG. 6(b), becomes smaller than that before the electric rotating machine M is tilted, thus keeping the degree to which the right portion S4 is cooled almost constant. The structure of the coolant supply pipe 12 of this embodiment, thus, ensures the efficiency in cooling the coil end 1 even when the vehicle is climbing a hill, so that the electric rotating machine M is tilted in the direction in which the rotating shaft 9 turns.

The first and second outlets 4a and 4b for the right coil end 1, as viewed in FIG. 1, are mirror-symmetrical in configuration with respect to the vertical center line extending perpendicular to the length of the rotating shaft 9 of the electric rotating machine M.

Figure 7A:
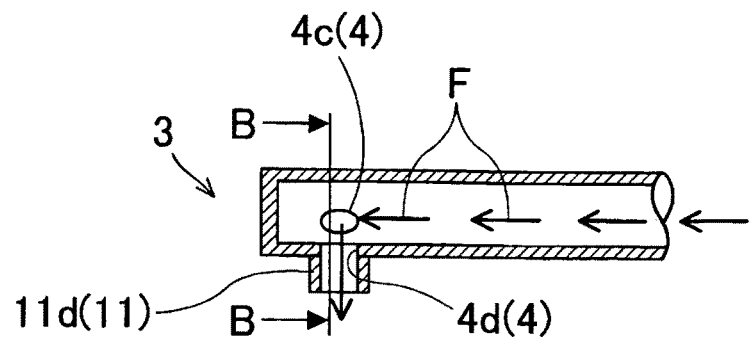
FIG. 7(a) is a partially longitudinal sectional view which shows a coolant supply pipe according to the fourth embodiment of the invention.
Figure 7B:
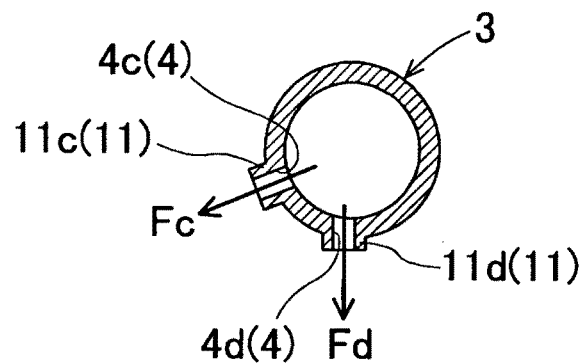
FIG. 7(b) is a transverse sectional view, as taken along the line B-B in FIG. 7(a)
Figure 7C:
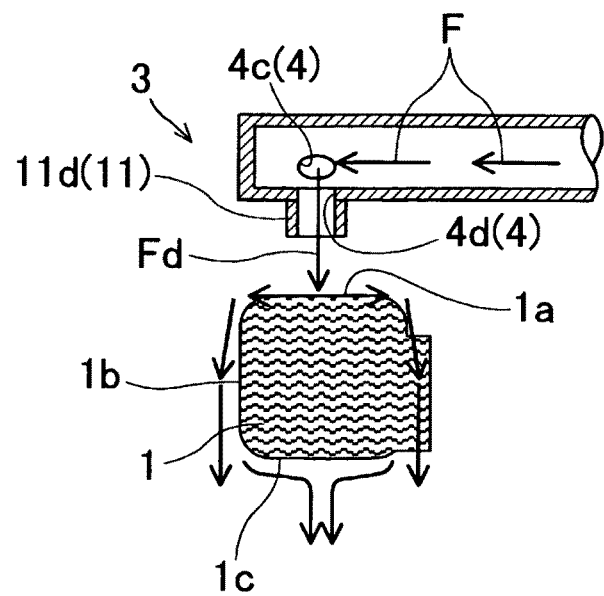
FIG. 7(c) is a partial sectional view which demonstrates streams of coolant which are dropped from the coolant supply pipe of FIGS. 7(a) and 7(b) and then flow along the surface of a coil end.

FIGS. 7(a) to 7(c) illustrate a coolant supply pipe 3 according to the fourth embodiment of the invention which is to be installed in the electric rotating machine M of FIG. 1. The same reference numbers as employed in the first embodiment will refer to the same parts, and explanation thereof in detail will be omitted here. FIG. 7(a) is a partially longitudinal sectional view which shows the coolant supply pipe 3. FIG. 7(b) is a transverse sectional view, as taken along the line B-B in FIG. 7(a). FIG. 7(c) is a partial sectional view which demonstrates streams of the coolant which are dropped from the coolant supply pipe 3 and then flow along the surface of the coil end 1.

The coolant supply pipe 3 of this embodiment is different from the one in the first embodiment in configuration of the coolant outlets 4. Other arrangements are identical, and explanation thereof in detail will be omitted here.

The coolant outlets 4 of the first embodiment are formed only by drilling the peripheral wall of the coolant supply pipe 3, while the coolant supply pipe 3 of this embodiment are also equipped with hollow cylindrical guides 11, one for each of the outlets 4. Specifically, the coolant supply pipe 3 has the first outlet 4c and the second outlet 4d for each of the coil ends 11. The first outlet 4c has the first cylindrical guide 11c extending outward therefrom to define a first coolant flow path through which the coolant is emitted to the coil end 1. Similarly, the second outlet 4d has the second cylindrical guide 11d extending outward therefrom to define a second coolant flow path through which the coolant is emitted to the coil end 1.

The first and second cylindrical guides 11c and 11d are equal to or different in height from one another. The first cylindrical guide 11c is oriented to have an axial center line extending obliquely downward and left, as viewed in FIG. 7(b) or viewed from a left side of FIG. 1, while the second cylindrical guide 11d is oriented to have an axial center line extending downward in the direction of gravitational force. Therefore, the first cylindrical guide 11c creates and directs a stream of the coolant in the left obliquely downward direction Fc, as viewed in. FIG. 7(b), while the second cylindrical guide 12d creates and directs a steam of the coolant in the vertical direction Fd. The orientations of the first and second guides 11c and 11d are not limited to the ones, as illustrated in FIG. 7(b), but may be determined in terms of areas of the surface of the coil end 1 required to be cooled.

The coolant, as discharged from the second cylindrical guide 11d in the vertical direction Fd, drops on the top surface 1a (i.e., an outer circumference) of the coil end 1, as illustrated in FIG. 7(c), flows along the outer and inner side surfaces 1b of the coil end 1, and then falls down. When the viscosity of the coolant is high, the coolant also moves from the side surfaces 1b to the bottom surface 1c (i.e., an inner circumference) of the coil end 1 and then falls down, thereby cooling almost the whole of the coil end 1. The coolant, as discharged from the first cylindrical guide 11c, flows on the coil end 1 in the same manner, as described above, except for the direction in which the coolant is emitted from the coolant supply pipe 3.

The coolant supply pipe 3 also has the first and second outlets 4c and 4d for the right coil end 1, as viewed in FIG. 1, which are mirror-symmetrical in configuration with respect to the vertical center line extending perpendicular to the length of the rotating shaft 9 of the electric rotating machine M.

Figure 8:
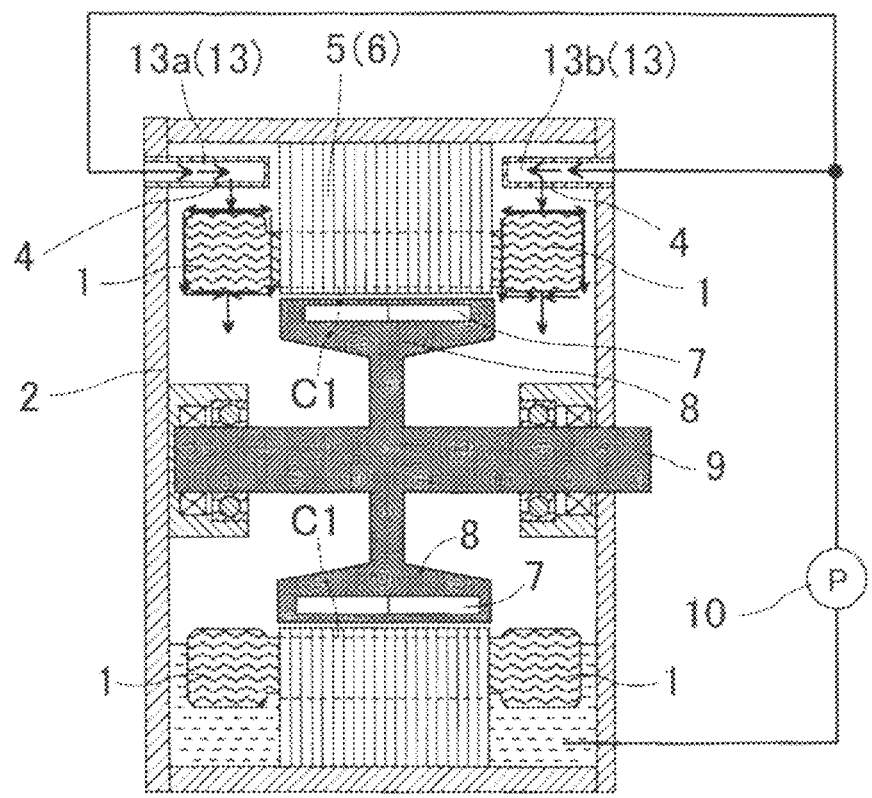
FIG. 8 is a longitudinal sectional view which shows an electric rotating machine with a cooling mechanism according to the fifth embodiment of the invention.

FIG. 8 illustrates the electric rotating machine M equipped with a cooling mechanism according to the fifth embodiment of the invention. The same reference numbers as employed in the first embodiment refer to the same parts, and explanation thereof in detail will be omitted here.

The coolant supply pipe 3 of the first embodiment, as clearly illustrated in FIG. 1, extends over the stator 6, thus causing the temperature of the coolant flowing through the coolant supply pipe 3 to rise slightly when the temperature of the stator 6 is much higher than that of the coolant.

In order to alleviate the above problem, the cooling mechanism of this embodiment includes a plurality of coolant supply pipes 13: a first coolant supply pipe 13a and a second coolant supply pipe 13b. The first coolant supply pipe 13a extends from a left side wall of the casing 2 over the left coil end 1. Similarly, the second coolant supply pipe 13b extends from a right side wall of the casing 2 over the right coil end 1. The first and second coolant supply pipes 13a and 13b connect with the pump 10 to get a supply of the coolant from the pump 10.

Each of the first and second coolant supply pipes 13a and 13b has formed therein coolant outlets 4 which may have any of the configurations in the above described first to fourth embodiments. The first coolant supply pipe 13a drops the coolant on the left coil end 1. The second supply pipe 13b drops the coolant on the right coil end 1. Other arrangements of the electric rotating machine M are identical with those in the first embodiment, and explanation thereof in detail will be omitted here.

The first and second coolant supply pipes 13a and 13b lie on the sides of the stator 6 without extending over the stator 6, thus minimizing a rise in temperature of the coolant due to the heat radiated from the stator 6.

Figure 9:
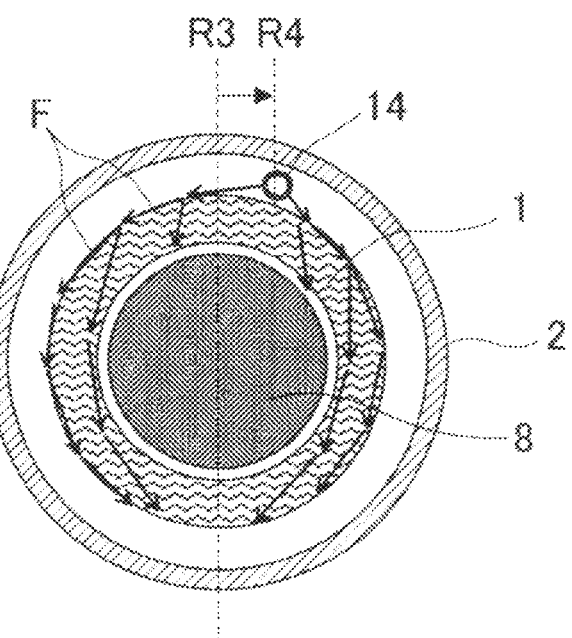
FIG. 9 is a transverse sectional view which shows a positional relation between a coolant supply pipe and a coil end according to the sixth embodiment of the invention.

FIG. 9 illustrates a coolant supply pipe 14 according to the sixth embodiment of the invention which is to be installed in the electric rotating machine M instead of the coolant supply pipe 3. The same reference numbers as employed in the first embodiment refer to the same parts, and explanation thereof in detail will be omitted here.

The coolant supply pipe 3 of the first embodiment is, as can be seen in FIG. 3(a), oriented with the vertical center line R1 passing through the radial centers of the coolant supply pipe 3 and the stator 6 (i.e., the coil end 1 or the rotor 8) being aligned with the direction of gravitational force. In contrast, the coolant supply pipe 14 lies with the length (i.e., the longitudinal center line) thereof being offset in a direction perpendicular to the direction of gravitational force from a plane extending through the axis of rotation of the rotor 8 in the direction of gravitational force. In other words, a vertical center line R4 passing through the radial center of the coolant supply pipe 14 in the direction of gravitational force is offset horizontally from a vertical center line R3 extending through the axial center of the rotor 8 in the direction of gravitational force.

The coolant supply pipe 14 is preferably located within an angular range defined by lines extending outward from the center of the coil end 1 (i.e., the stator 6) at angles of −45° to +45°, preferably −20° to +20' to a vertical center line (i.e., the line R3) extending through the center of the coil end 1 in the direction of gravitational force.

The coolant supply pipe 14 has formed therein coolant outlets 4 which may have any of the configurations in the above described first to fifth embodiments except that at least one of the coolant outlets 4 which is closer to the vertical center line R3, for example, the first outlet 4a in FIG. 6(a) has an open area smaller than those of the other outlets 4 in the first to fifth embodiments. The first outlet 4a is, therefore, higher in flow velocity of the coolant than the other outlets 4, thereby emitting the coolant far over the top of the coil end 1 to cool almost the whole of the left portion of the coil end 1, as viewed in FIG. 9.

The flow rate Q[L/min] of the coolant flowing into the coolant supply pipe 14, the open area S[m²] of the coolant outlet 4, the flow velocity V[m/sec.] of the coolant have a relation of V=(Q×10⁻³)/(S×60). This shows that the flow velocity Vat which the coolant is emitted from the coolant outlet 4 increases with a decrease in open area S of the outlet 4. The distance by which the coolant is required to be emitted from the coolant outlet 4 (e.g., the first outlet 4a) is, therefore, determined by selecting the open area S of the coolant outlet 4.

Other arrangements of the electric rotating machine M are identical with those in the first embodiment, and explanation thereof in detail will be omitted here.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

For instance, the cooling mechanism for the electric rotating machine M may be designed to have a combination of two or more of the features of the above described first to sixth embodiments.

Figure 10A:
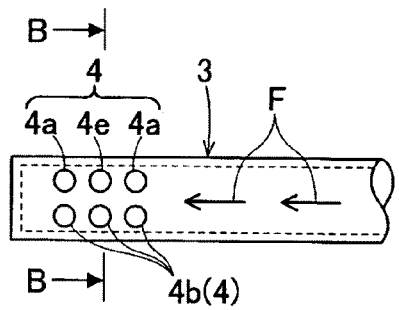
FIG. 10(a) is a partial bottom view which shows a modification of a coolant supply pipe to be installed in the electric rotating machine of FIG. 1.

Each of the coolant supply pipes 3, 12, 13, and 14 has the two coolant outlets 4 for each of the coil ends 1. The two coolant outlets 4 are located away from each other across a vertical center line (i.e., the line R1) passing through the radial centers of the coolant supply pipe 3, 12, or 14 and the stator 6 (i.e., the rotor 8). Each of the coolant supply pipes 3, 12, 13, and 14 may alternatively be designed to have two or more of the coolant outlets 4 on either side of the vertical center line. For example, the coolant supply pipe 3, as illustrated in FIG. 10(a), may have a first array of three coolant outlets 4a and a second array of three coolant outlets 4b for each of the coil ends 1. The first array and the second array are located across the vertical center line of the coolant supply pipe 3. The first array and the second array may be different in number of the coolant outlets 4 from each other and also have the four or more coolant outlets 4, respectively. The outlets 4a and 4b may be staggered between the first and second arrays in the lengthwise direction of the coolant supply pipe 3. The structure of FIG. 10(a) may have a total open area of the outlets 4 greater than that in the above embodiments, thus enabling more coolant to be sprayed to the coil ends 1 as far as the capacity of the pump 10 permits.

Figure 10B:
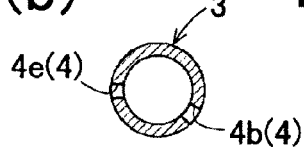
FIG. 10(b) is a transverse sectional view, as taken along the line B-B in FIG. 10(a)

The three outlets 4a are, as illustrated in FIG. 10(a), aligned with the length of the coolant supply pipe 3 (i.e., the direction in which the coolant flows), but a middle one 4e of the outlets 4a may be offset from an array of the other two outlets 4a in the radius direction of the coolant supply pipe 3. For example, the two outlets 4a other than the middle outlet 4e may be located, as illustrated in FIG. 2(c), while the middle outlet 4e may be located, as illustrated in FIG. 10(b), at an angular position normal to the vertical center line R1. FIG. 10(b) is a transverse sectional view, as taken along the line B-B in FIG. 10(a). The outlets 4a and the middle outlet 4e lie on the same side of the vertical center line R1, but different from each other in direction in which streams of the coolant to be emitted from the outlets 4a and the middle outlet 4e. The open area of the middle outlet 4e may be smaller than that of the outlets 4a, thereby enabling the middle outlet 4e to cool a distant area of the coil end 1 and the outlets 4a to cool a nearby area of the coil end 1. The shape of the outlets 4a and 4d needs not necessarily be circular.

Figure 10C:
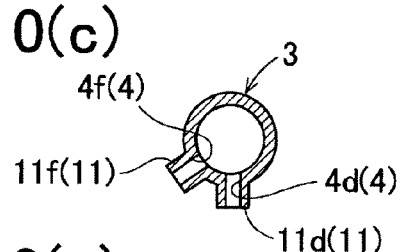
FIG. 10(c) is a transverse sectional view of a modification of a coolant supply pipe.

The coolant outlets 4 of FIG. 10(a) or 10(b) may be equipped with the cylindrical guides 11 as employed in the fourth embodiment of FIGS. 7(a) to 7(c). The first array and the second array of the outlets 4a and 4b may also be formed to have a locational relation, as illustrated in FIG. 10(c). For example, the outlets 4a correspond to outlets 4d, while the outlets 4b correspond to outlets 4f. The outlets 4d and 4f may also be equipped with the cylindrical guides 11d and 11f, respectively. The directions in which streams of the coolant are to be emitted from the outlets 4a and 4e to the coil end 11 may be altered by changing the orientations of the axes of the cylindrical guides 11c.

Figure 10D:
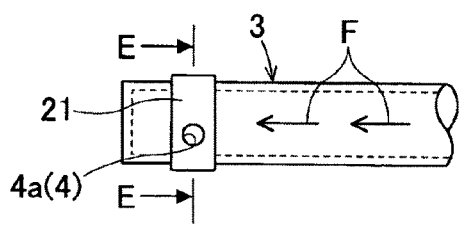
FIG. 10(d) is a partial bottom view which shows a modification of a coolant supply pipe to be installed in the electric rotating machine of FIG. 1.
Figure 10E:
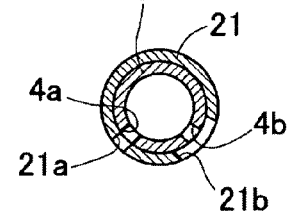
FIG. 10(e) is a transverse sectional view, as taken along the line E-E in FIG. 10(d)

Each of the coolant supply pipes 3, 12, 13, and 14 may alternatively be designed to have the coolant outlets 4 whose open area varies as the electric rotating machine M is tilted. This may be achieved by the structure, as illustrated in FIGS. 10(d) to 10(g). The coolant supply pipe 3 of FIGS. 10(d) to 10(g) includes an open area adjuster 21 made of an annular strip. For example, the coolant supply pipe 3 has the outlets 4a and 4b, as illustrated in FIG. 10(e). The open area adjuster 21 has formed therein first and second circular openings 21a and 21b spatially coinciding with the outlets 4a and 4b, respectively. The open area adjuster 21 is fit on the circumference of the coolant supply pipe 3 to be rotatable in a circumferential direction of the coolant supply pipe 3. When the electric rotating machine M lies in the correct orientation, as illustrated in FIG. 1, the open area adjuster 21 is placed at an angular position where the first and second openings 21a and 21b coincide with the first and second outlets 4a and 4b, respectively. When the electric rotating machine M is tilted in the direction in which the stator 6 turns, the open area adjuster 21 is kept unchanged in the angular position thereof. In other words, the open area adjuster 21 is held from turning even when the electric rotating machine M is tilted. This is achieved by an attitude control mechanism. For example, a weight block or an anchor is attached to a lowermost portion of the open area adjuster 21 to keep the attitude thereof unchanged. The open area adjuster 21 may alternatively be made to have a lowermost portion with an increased thickness functioning as the weight block or the anchor.

Figure 10F:
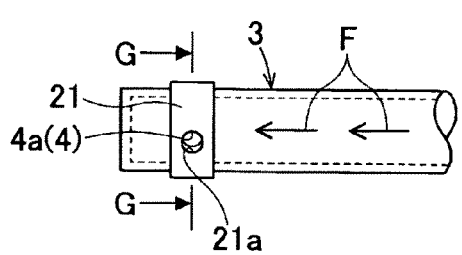
FIG. 10(f) is a partial bottom view which shows the coolant supply pipe of FIG. 10(d) when the electric rotating machine of FIG. 1 is tilted.
Figure 10G:
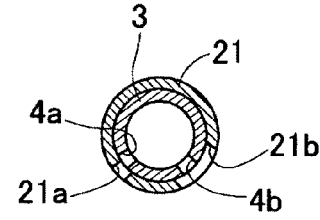
FIG. 10(g) is a transverse sectional view, as taken along the line G-G in FIG. 10(f)

The first and second openings 21a and 21b of the open area adjuster 21 may be equal to or different in size from each other. In the example of FIG. 10(e), the first opening 21a is identical in diameter or open area with the first outlet 4a, so that the first opening 21a just coincides with the first outlet 4a. The second opening 21b is greater in diameter or open area than the second outlet 4b, so that the second outlet 4b lies inside the second opening 21b spatially. Therefore, when the electric rotating machine M is tilted, the first outlet 4a, as can be seen in FIG. 4(g), will be out of spatial coincidence with the first opening 21a, thereby altering an open area of a flow path through which the coolant is to be emitted from the first outlet 4a, while the open area of the second outlet 4a is kept unchanged. FIG. 10(e) is a transverse sectional view, as taken along the line E-E in. FIG. 10(d). FIG. 10(g) is a transverse sectional view, as taken along the line G-G in FIG. 10(f).

FIGS. 10(d) and 10(e) illustrate for the case where the electric rotating machine M is in the correct orientation as illustrated in FIG. 1. FIGS. 10(f) and 10(g) illustrate for the case where the electric rotating machine M is tilted in the direction in which the stator 6 turns around the axis thereof. When the electric rotating machine is M is in the correct orientation, the open areas of the first and second outlets 4a and 4b, as described above, remain unchanged. When the electric rotating machine M is tilted, the open area of the first outlet 4a remains unchanged, while the open area of the second outlet 4b is decreased by the open area adjuster 21 as a function of the degree to which the electric rotating machine M is tilted. This causes the flow velocity at which the coolant is to be emitted from the first outlet 4a to be increased as long as the pressure of the coolant is kept constant, so that a stream of the coolant emitted from the first outlet 4a reaches a farther area of the coil end 1. A variation in open area of the first outlet 4a and/or the second outlet 4b is preferably determined based on a distance by which the coolant is required to be emitted to the coil end 1.

In the first embodiment, each of the first outlet 4a and the second outlet 4b is, as illustrated in FIG. 3(a), oriented to the coil end 11 at the angle θ1 to the vertical center line R1 passing through the radial centers of the coolant supply pipe 3 and the stator 6 (i.e., the rotor 8). The first outlet 4a may alternatively be made to have an axial center line inclined at an angle θ1a to the vertical center line R1, while the second outlet 4b may be made to have an axial center line inclined at an angle θ1b to the vertical center line R1 which is different from the angle θ1a. For instance, the angle θ1a may be greater than the angle θ1b. This enables the coolant to be emitted from the first outlet 4a to a farther area of the coil end 1 when the electric rotating machine M is tilted at the angle θ2, as illustrated in FIG. 4.

The first and second outlets 4a and 4b of the third embodiment are of a circular shape, but different in open area from each other. The first and second outlets 4a and 4b may alternatively be of another shape, for example, a polygonal shape such as oval or triangle. The first array of the outlets 4a and the second array of the outlets 4b illustrated in FIG. 10(a) may be different in number thereof. It is advisable that the first and second outlets 4a and 4b or the first and second arrays be different in configuration, size, and/or number thereof from each other so as to minimize a change in difference in total flow rate of the coolant to be drained between when the electric rotating machine M is in the correct orientation or when it is tilted in order to ensures the ability of the cooling mechanism in cooling the coil ends 1 regardless of the inclination of the electric rotating machine M.

Figure 10H:
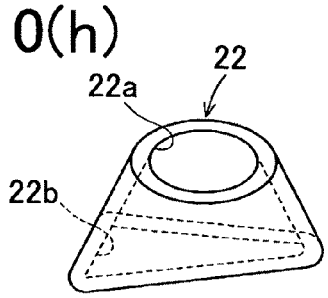
FIG. 10(h) is a perspective view which shows a modification of a flow guide to be installed on a coolant supply pipe.

The cylindrical guides 11 are of a circular in transverse cross section, as illustrated in, for example, FIGS. 7(a) to 7(c), but may alternatively be made to have another shape such as oval, polygonal (e.g., triangular or rectangular), or spoon-shape. Each of the cylindrical guides 11 may also have an inlet and an outlet which are different in size or shape from each other. For instance, each of the coolant supply pipes 3, 12, 13, and 14 may be equipped with flow guides 22, as illustrated in FIG. 10(h), which are to be used instead of the cylindrical guides 11. The flow guide 22 has an inlet 22a into which the coolant flows from the coolant supply pipe 3 and an outlet 22b from which the coolant is emitted to the coil end 1. The inlet 22a is of a circular shape. The outlet 22b is of a triangular shape. The inlet 22a and the outlet 22b may be equal to or different in size or area from one another. The flow guides 22 may be welded, glued, or joined mechanically to each of the coolant supply pipes 3, 12, 13, and 14. The flow guides 22 may alternatively be made by resin or metal and formed integrally with the body of each of the coolant supply pipes 3, 12, 13, and 14. When the outlet 22b of the flow guide 22 is oriented with the base of the triangle extending parallel to the side surface 1b of the coil end 1, it enables a large amount of coolant to be emitted to the side surface 1b of the coil end 1. The inlet 22a may alternatively be made to have a triangular shape, while the outlet 22b may be made to have a circular shape.

The guides 11 or 22 may be formed integrally with or separately from each of the coolant supply pipes 3, 12, 13, and 14. In the latter case, the guides 11 or 22 may be welded, glued, or joined mechanically to the body of each of the coolant supply pipes 3, 12, 13, and 14 through threads, bolts, or another similar mechanism. It is advisable that the guides 11 or 22 be joined detachably to each of the coolant supply pipes 3, 12, 13, and 14 for ease of replacement.

The electric rotating machine M of each of the first to sixth embodiments is equipped with the pump 10 which feeds the coolant directly to each of the coolant supply pipes 3, 12, 13, and 14, but may also have a tank disposed between each of the coolant supply pipes 3, 12, 13, and 14 and the pump 10. The tank stores therein the coolant, as fed from the pump 10, and feeds it at a pressure produced by accumulation of the coolant in the tank. The tank is usually cooled naturally, thus eliminating the need for an oil cooler. The tank may alternatively be installed inside the electric rotating machine M.

What is claimed is:

1. An electric rotating machine comprising:
   a rotor;
   a rotating shaft which is to be rotated by the rotor;
   a stator which faces a circumference of the rotor, the stator having a coil which is so wound as to have coil ends extending outside ends of the stator in an axial direction of the stator;
   a coolant supplying mechanism which supplies coolant;
   a coolant supply cylindrical member through which the coolant, as supplied from the coolant supplying mechanism, flows, the coolant supply cylindrical member having a length extending substantially parallel to an axis of rotation of the rotor and being disposed above the stator in a direction of gravitational force; and
   a first and a second coolant outlet which are formed in the length of the coolant supply cylindrical member and through which the coolant is to be emitted to a coil end, the first and the second coolant outlets being so oriented as to direct streams of the coolant to a first area and a second area of the coil end which are different in location from each other,
   wherein the coolant supply cylindrical member lies with the length thereof being offset in a direction perpendicular to the direction of gravitational force from a plane extending through the axis of rotation of the rotor in the direction of gravitational force.

2. An electric rotating machine as set forth in claim 1, wherein the first and second coolant outlets are located away from each other across a plane extending through a longitudinal center line of the coolant supply cylindrical member and an axial center line of the rotor.

3. An electric rotating machine as set forth in claim 1, wherein the first and second coolant outlets are located so that a center line passing through a center of an opening of each of the first and second coolant outlets is offset toward a side surface of the coil end from a center line passing through a center of a width of the coil end in an axial line of the coil.

4. An electric rotating machine as set forth in claim 1, wherein the first coolant outlet is greater in open area from the second coolant outlet.

5. An electric rotating machine as set forth in claim 1, wherein the coolant supply cylindrical member includes guides, one for each of the first and second coolant outlets, each of the guide defining a direction in which the coolant is to be emitted from a corresponding one of the first and second coolant outlets.

6. An electric rotating machine as set forth in claim 1, wherein the first coolant outlet which becomes closer to a plane extending through the axis of rotation of the rotor in the direction of gravitational force than the second coolant outlet when the electric rotating machine is tilted in a direction in which the rotor turns is greater in open area than the second coolant outlet.

* * * * *